United States Patent
Shanley et al.

(10) Patent No.: US 10,334,040 B2
(45) Date of Patent: *Jun. 25, 2019

(54) SHARING INFORMATION BETWEEN APPLIANCES OVER A WAN VIA A DISTRIBUTED P2P PROTOCOL

(71) Applicant: VMware, Inc., Palo Alto, CA (US)

(72) Inventors: Dave Shanley, Fremont, CA (US); Wit Riewrangboonya, Mountain View, CA (US)

(73) Assignee: VMware, Inc., Palo Alto, CA (US)

(*) Notice: Subject to any disclaimer, the term of this patent is extended or adjusted under 35 U.S.C. 154(b) by 213 days.

This patent is subject to a terminal disclaimer.

(21) Appl. No.: 14/702,496

(22) Filed: May 1, 2015

(65) Prior Publication Data
US 2016/0323376 A1    Nov. 3, 2016

(51) Int. Cl.
| | | |
|---|---|---|
| *G06F 15/173* | (2006.01) |
| *H04L 29/08* | (2006.01) |
| *G06F 9/455* | (2018.01) |
| *H04L 12/26* | (2006.01) |
| *H04L 12/24* | (2006.01) |

(52) U.S. Cl.
CPC ...... *H04L 67/1061* (2013.01); *G06F 9/45558* (2013.01); *H04L 41/12* (2013.01); *H04L 43/0817* (2013.01); *G06F 2009/45591* (2013.01); *G06F 2009/45595* (2013.01)

(58) Field of Classification Search
CPC ............. H04L 67/1061; H04L 43/0823; H04L 67/1063; H04L 67/1065; G06F 9/45558; G06F 2009/45595; G06F 2009/45591
See application file for complete search history.

(56) References Cited

U.S. PATENT DOCUMENTS

| | | | |
|---|---|---|---|
| 6,167,427 A | 12/2000 | Rabinovich et al. |
| 8,613,070 B1* | 12/2013 | Borzycki ............ G06F 21/6218 |
| | | | 726/8 |
| 9,460,220 B1* | 10/2016 | Jenkins ............. G06F 17/30876 |
| 9,483,281 B2* | 11/2016 | Bonczkowski ........... G06F 8/61 |
| 2006/0168126 A1* | 7/2006 | Costa-Requena .............. |
| | | | H04L 12/2803 |
| | | | 709/219 |
| 2007/0162425 A1 | 7/2007 | Betawadkar-Norwood et al. |
| 2009/0320103 A1* | 12/2009 | Veeraraghavan ..... G06F 21/335 |
| | | | 726/4 |

(Continued)

OTHER PUBLICATIONS

"CIOs: Pay Attention to the Growing Trends of Commoditization and Hyper-convergence"; Lowe, Scott; Dec. 5, 2012; 8 pages.*

*Primary Examiner* — John B Walsh

(57) ABSTRACT

In a non-transitory computer-readable storage medium having instructions embodied therein that when executed cause a computer system to perform a method of sharing information between pre-configured hyper-converged computing devices over a wide area network via a distributed peer-to-peer protocol. The method includes automatically discovering pre-configured hyper-converged computing devices in a local area network, and sharing information between pre-configured hyper-converged computing devices over a wide area network via a distributed peer-to-peer protocol such that there is no single point of failure for the sharing information between the pre-configured hyper-converged computing devices over the wide area network.

17 Claims, 12 Drawing Sheets

(56) References Cited

U.S. PATENT DOCUMENTS

2011/0279266 A1 11/2011 Nolterieke et al.
2013/0152376 A1 6/2013 Corddry et al.

* cited by examiner

1100

SHARE METRICS BETWEEN PRE-CONFIGURED HYPER-CONVERGED COMPUTING DEVICES OVER A WIDE AREA NETWORK VIA A DISTRIBUTED PEER-TO-PEER PROTOCOL, WHEREIN AT LEAST SOME OF THE PRE-CONFIGURED HYPER-CONVERGED COMPUTING DEVICES ARE LOCATED IN SEPARATE GEOGRAPHICAL LOCATIONS
1110

DISTRIBUTED MONITOR OF ANY OF THE PRE-CONFIGURED HYPER-CONVERGED COMPUTING DEVICES IN THE WIDE AREA NETWORK BASED ON THE DISTRIBUTED PEER-TO-PEER PROTOCOL AND A FEDERATED SINGLE SIGN-ON SUCH THAT THERE IS NO SINGLE POINT OF FAILURE FOR THE DISTRIBUTED MONITORING
1120

DISTRIBUTED MONITOR OF ANY INDEPENDENT SERVER NODE OF ANY OF THE PRE-CONFIGURED HYPER-CONVERGED COMPUTING DEVICES IN THE WIDE AREA NETWORK
1122

AUTOMATICALLY DISCOVER THE PRE-CONFIGURED HYPER-CONVERGED COMPUTING DEVICES IN A LOCAL AREA NETWORK
1130

CONTROL A CENTRALIZED MANAGEMENT TOOL OF A CLUSTER OF PRE-CONFIGURED HYPER-CONVERGED COMPUTING DEVICES BASED ON THE INFORMATION SHARED BETWEEN THE PRE-CONFIGURED HYPER-CONVERGED COMPUTING DEVICES
1140

AUTOMATICALLY DISCOVER, BY A COMPUTING DEVICE, OTHER COMPUTING DEVICES IN A LOCAL AREA NETWORK
1210

PEER-TO-PEER COMMUNICATE, BY SAID COMPUTING DEVICE, WITH ANOTHER COMPUTING DEVICE OUTSIDE OF SAID LOCAL AREA NETWORK VIA A NETWORK BROKER
1220

SHARE METRICS BETWEEN PRE-CONFIGURED HYPER-CONVERGED COMPUTING DEVICES OVER A WIDE AREA NETWORK VIA A DISTRIBUTED PEER-TO-PEER PROTOCOL
1222

FIG. 12

SHARING INFORMATION BETWEEN APPLIANCES OVER A WAN VIA A DISTRIBUTED P2P PROTOCOL

CROSS-REFERENCE TO RELATED APPLICATIONS

This application is related to co-pending U.S. patent application Ser. No. 14/702,387, filed on May 1, 2015, entitled "APPLIANCE FOR SHARING INFORMATION OVER A WAN VIA A DISTRIBUTED P2P PROTOCOL," by Dave Shanley et al, and assigned to the assignee of the present application.

BACKGROUND

Oftentimes virtual computing environments include numerous computing devices in various geographical locations. As a result, it is cumbersome and complex to link all of the computing devices to one another such that a user, such as an IT administrator, is able to universally monitor the operational metrics of each of the computing devices in the various geographical locations.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 11 depicts a flow diagram for a method for sharing information between pre-configured hyper-converged computing devices over a wide area network via a distributed peer-to-peer protocol, according to various embodiments.

FIG. 12 depicts a flow diagram for a method for peer-to-peer communication outside of a local area network via a network broker, according to various embodiments.

DETAILED DESCRIPTION OF CERTAIN EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Figure 1:
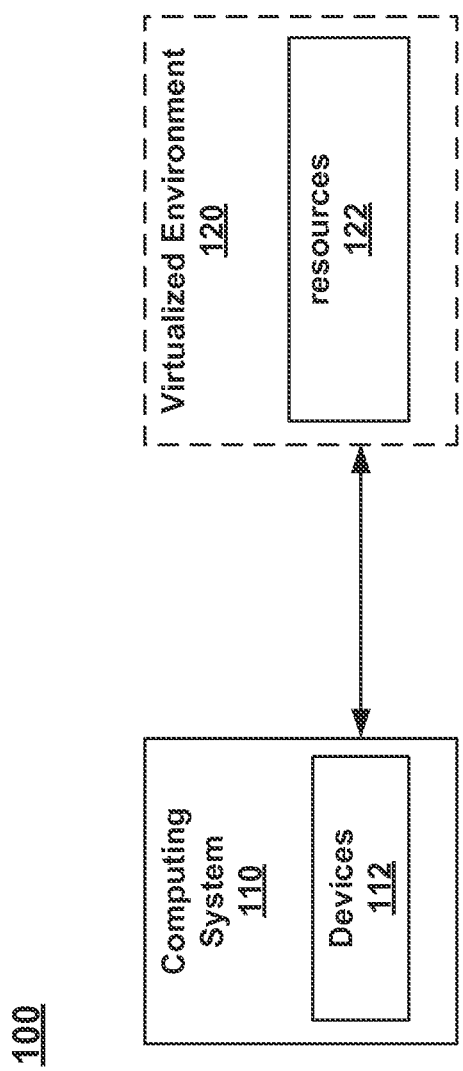
FIG. 1 depicts a block diagram of a virtual computing environment, according to various embodiments.

I. Embodiments of Automatic Discovery of Pre-Configured Hyper-Converged Computing Devices FIG. 1 depicts a block diagram that illustrates virtual computing environment (VCE) 100 (or virtualization infrastructure) that includes computing system 110 and virtualized environment 120, according to various embodiments. In general, computing system 110 and virtualized environment 120 are communicatively coupled over a network such that computing system 110 may access functionality of virtualized environment 120.

As will be described in further detail below, computing system 110 is implemented using virtualized environment 120. Also, while implementing the business functionality, computing system 110 might use some of resources 122.

In one embodiment, computing system 110 may be a system (e.g., enterprise system) or network that includes a combination of computer hardware and software. The corporation or enterprise utilizes the combination of hardware and software to organize and run its operations. To do this, system 110 uses resources 122 because system 110 typically does not have dedicated resources that can be given to the virtualized environment. For example, an enterprise system may provide various computing resource for various needs such as, but not limited to information technology (IT), security, email, etc.

In various embodiments, computing system 110 includes a plurality of devices 112. The devices are any number of physical and/or virtual machines. For example, in one embodiment, computing system 110 is a corporate computing environment that includes tens of thousands of physical and/or virtual machines. It is understood that a virtual machine is implemented in virtualized environment 120 that includes one or some combination of physical computing machines. Virtualized environment 120 provides resources 122, such as storage, memory, servers, CPUs, network switches, etc., that are the underlying hardware infrastructure for VCE 100.

The physical and/or virtual machines may include a variety of operating systems and applications (e.g., operating system, word processing, etc.). The physical and/or virtual machines may have the same installed applications or may have different installed applications or software. The installed software may be one or more software applications from one or more vendors.

Each virtual machine may include a guest operating system and a guest file system.

Moreover, the virtual machines may be logically grouped. That is, a subset of virtual machines may be grouped together in a container (e.g., VMware vApp™). For example, three different virtual machines may be implemented for a particular workload. As such, the three different virtual machines are logically grouped together to facilitate in supporting the workload. The virtual machines in the logical group may execute instructions alone and/or in combination (e.g., distributed) with one another. Also, the container of virtual machines and/or individual virtual machines may be controlled by a virtual management system. The virtualization infrastructure may also include a plurality of virtual datacenters. In general, a virtual datacenter is an abstract pool of resources (e.g., memory, CPU, storage). It is understood that a virtual data center is implemented on one or some combination of physical machines.

In various embodiments, computing system 110 may be a cloud environment, built upon a virtualized environment 120. Computing system 110 may be located in an Internet connected datacenter or a private cloud computing center coupled with one or more public and/or private networks. Computing system 110, in one embodiment, typically couples with a virtual or physical entity in a computing environment through a network connection which may be a public network connection, private network connection, or some combination thereof. For example, a user may couple via an Internet connection with computing system 110 by accessing a web page or application presented by computing system 110 at a virtual or physical entity.

As will be described in further detail herein, the virtual machines are hosted by a host computing system. A host includes virtualization software that is installed on top of the hardware platform and supports a virtual machine execution space within which one or more virtual machines may be concurrently instantiated and executed.

In some embodiments, the virtualization software may be a hypervisor (e.g., a VMware ESX™ hypervisor, a VMware ESXi™ hypervisor, etc.) For example, if hypervisor is a VMware ESX™ hypervisor, then virtual functionality of the host is considered a VMware ESX™ server.

Additionally, a hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. Additional details regarding embodiments of structure and functionality of a host computer system are provided with respect to FIG. 2.

During use, the virtual machines perform various workloads. For example, the virtual machines perform the workloads based on executing various applications. The virtual machines can perform various workloads separately and/or in combination with one another.

Example Host Computer System

Figure 2:
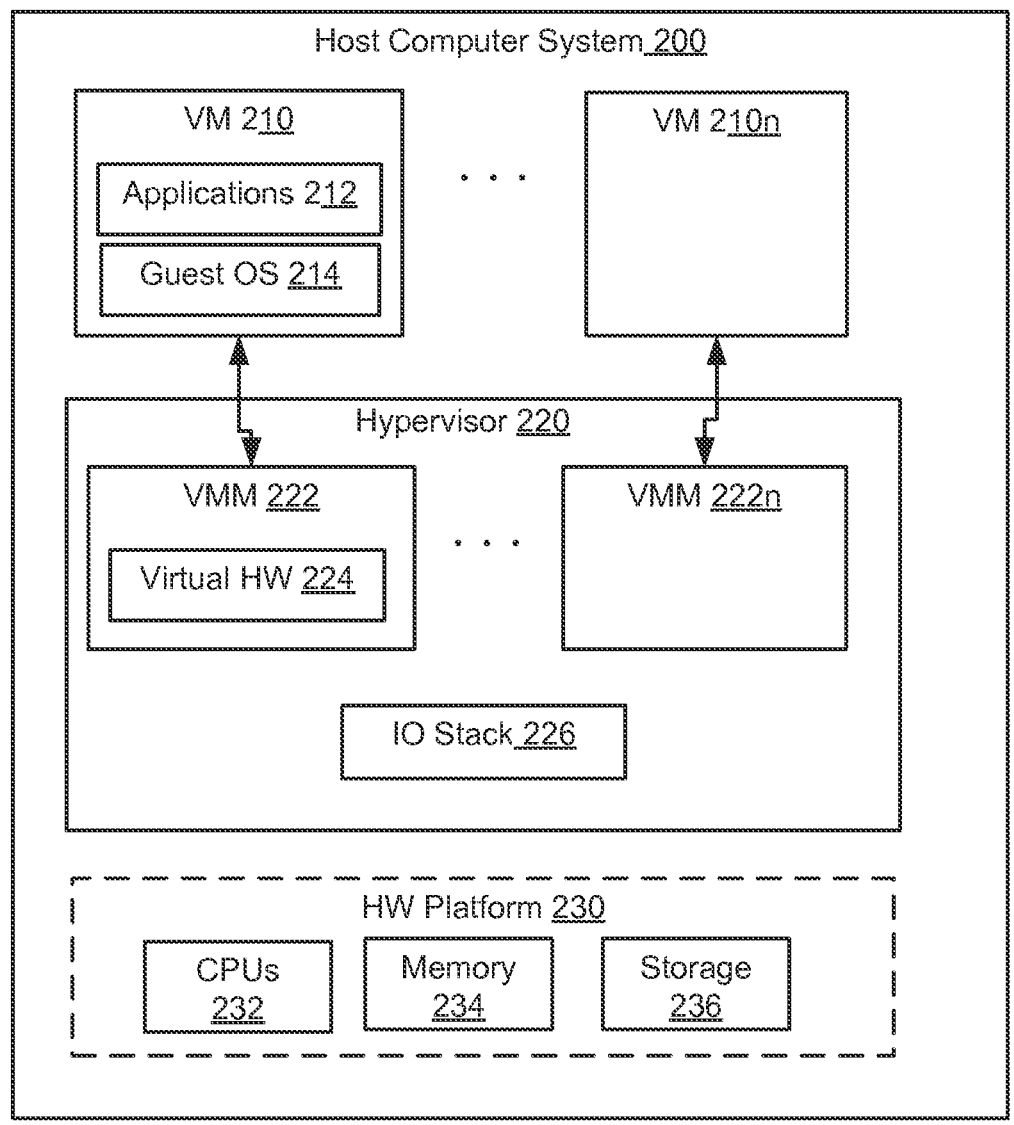
FIG. 2 depicts a block diagram of a host computing system, according to various embodiments.

FIG. 2 is a schematic diagram that illustrates a virtualized computer system that is configured to carry out one or more embodiments of the present invention. The virtualized computer system is implemented in a host computer system 200 including hardware platform 230. In one embodiment, host computer system 200 is constructed on a conventional, typically server-class, hardware platform.

Hardware platform 230 includes one or more central processing units (CPUs) 232, system memory 234, and storage 236. Hardware platform 230 may also include one or more network interface controllers (NICs) that connect host computer system 200 to a network, and one or more host bus adapters (HBAs) that connect host computer system 200 to a persistent storage unit.

Hypervisor 220 is installed on top of hardware platform 230 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 224 for virtual machine 210 supports the installation of guest OS 214 which is capable of executing applications 212 within virtual machine 210.

Guest OS 214 may be any of the well-known commodity operating systems, and includes a native file system layer, for example, either an NTFS or an ext3FS type file system layer. IOs issued by guest OS 214 through the native file system layer appear to guest OS 214 as being routed to one or more virtual disks provisioned for virtual machine 210 for final execution, but such IOs are, in reality, reprocessed by IO stack 226 of hypervisor 220 and the reprocessed IOs are issued, for example, through an HBA to a storage system.

Virtual machine monitor (VMM) 222 and 222n may be considered separate virtualization components between the virtual machines and hypervisor 220 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

Examples of an Appliance

Figure 3:
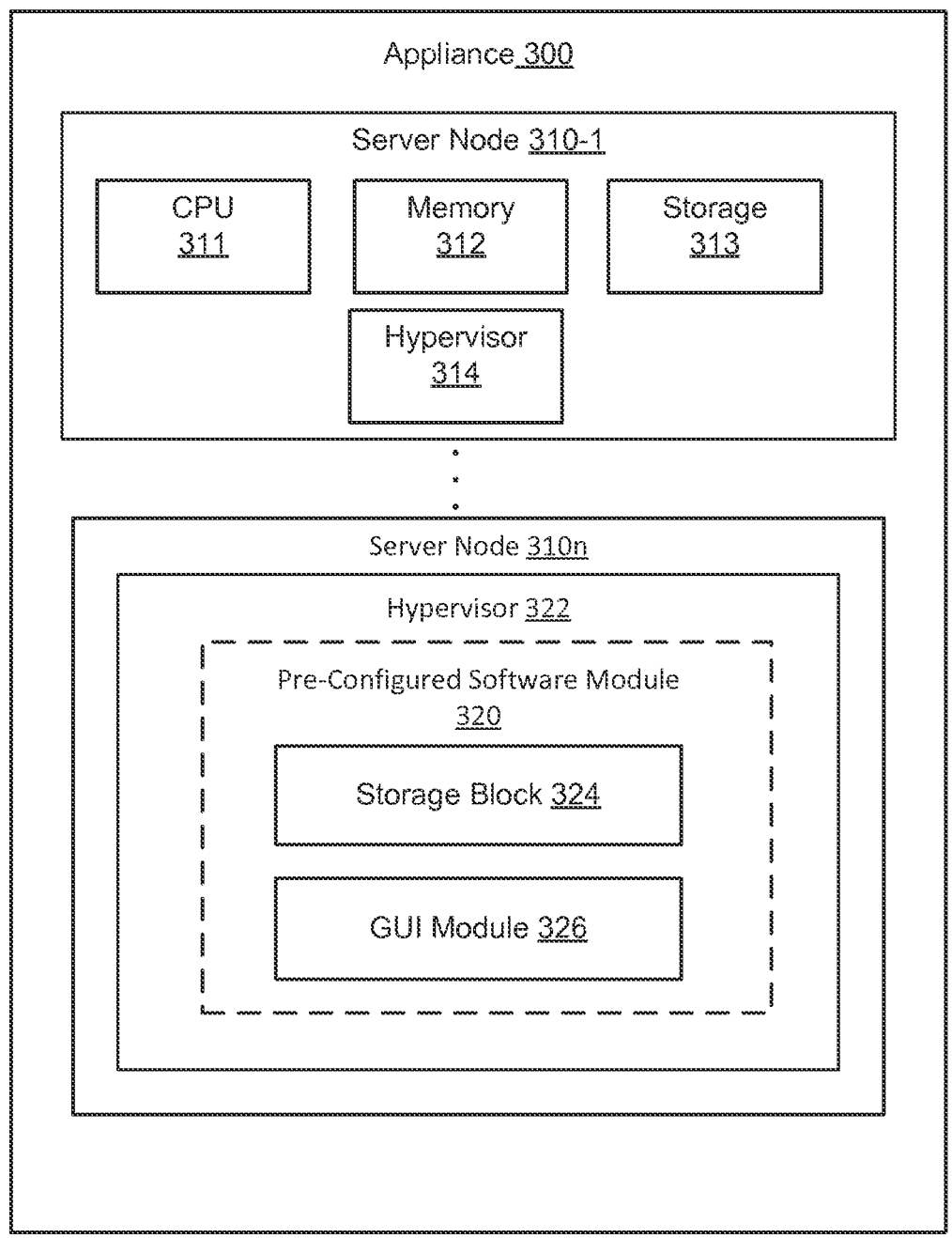
FIG. 3 depicts a block diagram of an appliance, according to various embodiments.

FIG. 3 depicts an embodiment of appliance 300. Appliance 300 is a computing device that includes the requisite physical hardware and software to create and manage a virtualization infrastructure. Appliance 300 is also referred to herein as a pre-configured hyper-converged computing device. In general, a hyper-converged computing device includes pretested, pre-configured and pre-integrated storage, server and network components, including software, that are located in an enclosure. Moreover, the hyper-converged computing device includes a hypervisor that supports a virtualization infrastructure.

Based on the pre-configured hardware and software disposed within appliance 300, appliance 300 enables a user to simply and quickly create a virtualization infrastructure and deploy virtual machines shortly after the appliance is powered on for the first time.

Appliance 300 includes, among other things, at least one server node. For example, server nodes 310-1 through server node 310-n. Server node 310-1 includes a central processing unit (CPU) 311, memory 312, and storage 313. It should be appreciated that other server nodes (i.e., server node 310-n) each include a CPU, memory, and storage similar to server node 310-n.

Additionally, each server node includes a hypervisor. For example, server node 310-1 includes hypervisor 314 and server node 310-n includes hypervisor 322.

As described above, a hypervisor is installed on top of hardware platform (e.g., CPU, memory and storage) and supports a virtual machine execution space within which one or more virtual machines (VMs) may be concurrently instantiated and executed.

In various embodiments, a hypervisor (e.g., hypervisor 314 and 322) is VMware ESX™ hypervisor or a VMware ESXi™ hypervisor. It is noted that "ESX" is derived from the term "Elastic Sky X" coined by VMware™. Additionally, as stated above, if hypervisor is a VMware ESX™ hypervisor, then virtual functionality of the host is considered a VMware ESX™ server. Moreover, although the node is physical hardware it includes hypervisor functionality based on the hypervisor implemented on the server node.

Appliance 300 is scalable. That is appliance can be scaled to include more than one server node. For example, appliance 300 can initially have a single server node. However, additional server nodes may be included in appliance 300.

In one embodiment, appliance 300 is able to deploy a plurality of virtual machines in the virtualization infrastructure. For example, based on the hardware and software incorporated in appliance 300, appliance 300 is able to deploy pre-set number of virtual machines (e.g., 75 virtual machines, 150 virtual machines, etc.).

Moreover, each server node may be considered a server or host computing system. That is, each server node is able to independently host a number of virtual machines. For example, server node 310-1 is able to host a first set of virtual machines, while other server nodes are each able to independently host other sets of virtual machines, respectively.

The server nodes are independent of one another, and are not required to share any functionality with one another. Appliance 300 does not include a backplane. As such, the server nodes are isolated from one another and therefore independent of one another.

CPU 311 may be, but is not limited to, a dual socket CPU (e.g., Intel Xeon™ CPUs, 4-core to 6-core).

Memory 312 may be, but is not limited to, 128 gigabytes (GB).

Storage may be, but is not limited to, three drive slots per node. Such as a solid state drive (SSD) (e.g., an SSD up to 800 GB), and two hard disk drives (HDD) (e.g., HDDs up to 8 terabytes (TB)).

Additionally, the appliance may include various external interfaces, such as but not limited to, serial, network RJ-45 (10000 NIC), graphics, management RJ-45 (100/10000 NIC), power (in front and in rear), UID (in front and in rear) and a USB.

The appliance may also include Component Interconnect Express (PCIe) expansion slots, and a disk controller with pass through capabilities. It should be appreciated that the appliance may include other hardware attributes that are compatible with supporting a virtualization infrastructure.

In one embodiment, appliance 300 is a rackable 2U/4Node appliance. That is, appliance 300 is two rack units in height and includes four server nodes (e.g., server nodes 310-1 through 310-n).

The size of a piece of rack-mounted equipment is described as a number in "U" or "RU" (rack unit). One rack unit is often referred to as "1 U", 2 rack units as "2U" and so on. "U" is a unit of measure that describes the height of equipment designed to mount in a rack (e.g., 19-inch rack or a 23-inch rack). The 19-inch (482.6 mm) or 23-inch (584.2 mm) dimension refers to the width of the equipment mounting frame in the rack including the frame. In some instances, one rack unit is 1.75 inches (4.445 cm) high.

In another embodiment, appliance 300 is a 4U/4Node appliance. That is, appliance 300 is four rack units in height and includes 4 server nodes (e.g., server nodes 310-1 through 310-n).

Appliance 300 includes software to support a virtualization infrastructure. That is, appliance 300 includes code or instructions stored on physical hardware in appliance 300, that when executed by a processor, supports a virtualization infrastructure. For instance, appliance 300 includes pre-configured software module 320.

It should be appreciated that the software installed on appliance 300 (e.g., software module 320) is stored in a storage device. In various embodiments, the software may be installed in a single server node or may be distributed in various server nodes. In another embodiment, the software may be stored in a storage device within appliance 300 but is outside of the server nodes.

During operation of the appliance, the software may be executed by one or more CPUs in a single server node or the execution may be distributed amongst various CPUs in various server nodes.

It should be appreciated that software module 320, in one embodiment, includes a suite of software tools for cloud computing (e.g., VMware vSphere™, VCenter™) that utilizes various components such as a VMware ESX/ESXi hypervisor. Accordingly, software module 320 may be a controlling module for at least appliance 300 based on the controlling software tools (e.g., VMware vSphere™, VCenter™).

Software module 320, in one embodiment, includes a centralized management tool for an appliance or a cluster of appliances, which will be described in further detail below. The centralized management tool, in one embodiment, is for the management of multiple ESX hosts and virtual machines (VMs) from different ESX hosts through a single console application. It should be appreciated that the virtualization infrastructure, or portions of the virtualization infrastructure may be managed by the centralized management tool via a user interface. Additionally, the centralized management tool manages or controls the hypervisors in appliance 300. For example, the centralized management tool controls the hypervisor it runs in (e.g., hypervisor 322) and controls the other hypervisors (e.g., hypervisor 314) in the other nodes (e.g., server node 310-1). The centralized management tool may also include a federated SSO module and auto-discovery module which are described in further detail below. The centralized management tool, in one embodiment, is centralized management tool 830 as described herein with at least reference to FIG. 8.

Software module 320 includes storage block 324. Storage block 324 is a logical partition of storage (e.g., storage 313) in appliance 300. In other words, storage block 324 is virtual storage. In one embodiment, storage block 314 is a virtual storage area network (VSAN). As a result, the VSAN allows traffic to be isolated within specific portions of a storage area network.

Various advantages occur due to the storage block integrated with the hypervisor. In one example, the VSAN communicates with the ESX layer at a kernel level and is not required to communicate over a network via an Ethernet connection. As such, communication latency between the storage block and hypervisor is reduced.

GUI module 326 is code or instructions that enable the utilization of a graphical user interface to creating and managing appliances (e.g., ESX hosts) and virtual machines of the virtualization infrastructure. The graphical user interface is described in further detail below.

It is noted that software module 320 is proprietary software of a single entity (e.g., VMware™). For example, hypervisor 322, storage block 324, and GUI module 326 are proprietary software code to a single entity. That is, hypervisor 322, storage block 324, and GUI module 326 are not open source code, and therefore require a license agreement between the licensor (e.g., VMware™) and a purchaser of the appliance that includes the proprietary software module. In one embodiment, the license agreement is an end-user license agreement (EULA). The EULA establishes the purchaser's right to use the software (e.g., software module 320) and the hardware of appliance 300.

Figure 4:
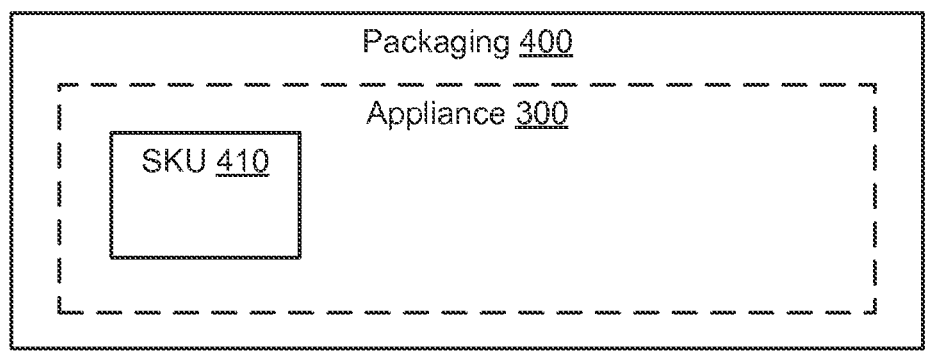
FIG. 4 depicts a block diagram of a side-view of an appliance offered for sale, according to various embodiments.

FIG. 4 depicts an embodiment of a side-view of an appliance offered for sale. In one embodiment, appliance 300 is offered for sale as a single stock keeping unit (SKU). For example, appliance 300 is disposed in packaging 400 and SKU 410 is on packaging 400. Accordingly, appliance 300 is offered for sale as a single SKU.

More specifically, appliance 300, as described herein, is pre-configured with the requisite hardware and software for employing a virtualization infrastructure. Therefore, subsequent the purchase of appliance 300 as a single SKU, appliance 300 is not required to include any additional hardware and/or software to support and manage a virtualization infrastructure.

Upon powering on appliance 300 for the first time, a single EULA is displayed to an end-user. Because software module 320 is proprietary to a single entity (e.g., VMware™), only a single EULA, provided by the single entity, is displayed to the purchasing end-user. More specifically, at least hypervisor 322 (e.g., ESX/ESXi hypervisor) and storage block 324 (e.g., VSAN) are proprietary to a single entity (e.g., VMware™). Therefore, only a single EULA pertaining to hypervisor 322 and storage block 324 is displayed and provided to an end-user.

Upon acceptance of the EULA, appliance 300 is enabled to operate and manage a virtualization infrastructure, and deploy virtual machines in the virtualization infrastructure.

It should be appreciated that upon first powering on appliance 300 and accepting the single EULA, a virtualization infrastructure is able to be rapidly created and a virtual machine is able to be deployed within the virtualization infrastructure within minutes (e.g., 15 minutes). Moreover, the virtualization infrastructure is able to be managed and controlled by an end-user that is not required to have high-level IT administrative training and experience.

In one embodiment, appliance 300 is able to deploy a plurality of virtual machines in the virtualization infrastructure. For example, based on the hardware and software incorporated in appliance 300, appliance 300 is able to deploy pre-set number of virtual machines (e.g., 75 virtual machines, 150 virtual machines, etc.).

Examples of Virtualization Infrastructures

Figure 5:
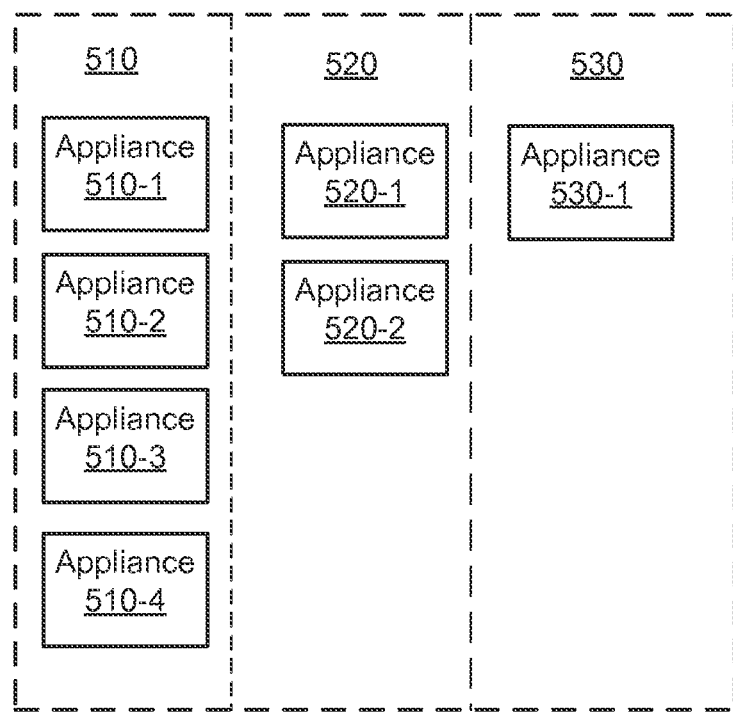
FIG. 5 depicts a block diagram of a virtualization infrastructure, according to various embodiments.

FIG. 5 depicts an embodiment of various appliances supporting virtualization infrastructure 500.

In one embodiment, appliances may be grouped together to increase the functionality of creating and managing a virtualization infrastructure. For example, appliance 510-1 was initially utilized to deploy a plurality of virtual machines, at location 510. However, additional virtual machines were desired but appliance 510-1, alone, was not able to meet the demand for the desired additional virtual machines. As such, additional appliances 510-2, 510-3, and 510-4 were purchased and grouped together to meet the demand of the additional virtual machines. In particular, the cluster of appliances which are communicatively coupled together, act as a single platform for managing the virtualization infrastructure and deploying virtual machines.

Similarly, appliance 520-1 was initially utilized to deploy a plurality of virtual machines, at location 520. However, additional virtual machines were desired but appliance 520-1, alone, was not able to meet the demand for the desired additional virtual machines. As such, additional appliance 520-2 was purchased and grouped together with appliance 520-1 to meet the demand of the additional virtual machines.

It should be appreciated that any number of appliances may be grouped together. For example, two, three, four, five or more appliances may be grouped together provided that the functionality of the appliances, as a whole, are able to act as a single platform for managing the virtualization infrastructure.

Additionally, the appliances and/or clusters of appliances may be located at various locations. For example, a first cluster of appliances may be located at a main office of an enterprise, while a second cluster of appliances are located at a remote office/branch office (ROBO).

In another example, virtualization infrastructure 500 is a virtualization infrastructure of a large enterprise having various building and infrastructure at various geo-locations. In such an example, information technology (IT) is located at a first location (e.g., location 510), an engineering team is located at a second location (e.g., location 520) and sales team is located at location 530.

Accordingly, appliances 510-1 through 510-4 may be grouped together at a first location 510 to support the demand for virtual machines of the IT team, appliances 510-1 and 510-2 are grouped together at location 520 to support the demand of virtual machines for the engineering team, and appliance 530-1 is located at location 530 to support the demand of virtual machines for the sales team.

As will be described in further detail below, GUI module 326 enables a GUI to facilitate the creating and managing of hosts and virtual machines. Moreover, the GUI is able to facilitate in managing the virtualization infrastructure by displaying the attributes of the appliances. For example, the GUI would display the particular health, resources used, and the like, for each of the appliances in virtualization infrastructure 500.

Embodiments of Auto-Discovery of Appliances in a Network

Figure 6:
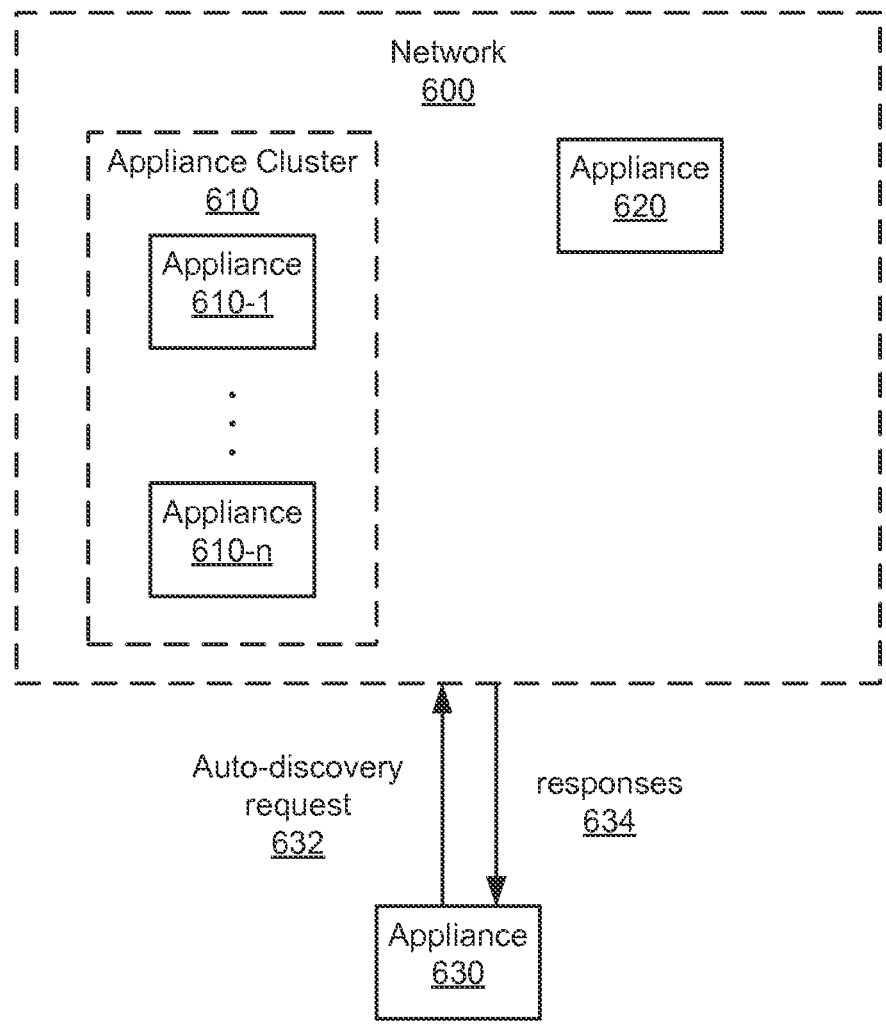
FIG. 6 depicts a block diagram of a virtualization infrastructure, according to various embodiments.

FIG. 6 depicts an embodiment of network 600 (or virtualization infrastructure).

Network 600 may include one or more appliances. For example, network 600 may include various appliances that are grouped together in a cluster and/or stand-alone.

Network 600, in one embodiment, includes appliance cluster 610 that includes appliances 610-1 through 610-n. Appliances 610-1 through 610-n are communicatively coupled and act as a single platform for managing the virtualization infrastructure and deploying virtual machines.

Additionally, network 600 may include stand-alone appliances such as appliance 620. Appliance 620 is independent to other clusters and other stand-alone appliances.

It is noted that appliances in network 600 (stand-alone appliances and/or clustered appliances) are authenticated and configured to function within network 600.

It may be desired that additional appliances are added to network 600 either as a stand-alone appliance or part of an existing appliance cluster to increase the functionality of the virtualization infrastructure. Moreover, the auto-discovery of other appliances that are authenticated and configured for use in the network is beneficial to the overall management of the appliances and network.

Referring still to FIG. 6, appliance 630 is intended to be added to network 600. Appliance 630 is initially communicatively coupled to network 600 (prior to being authenticated and configured to be included in network 600).

Appliance 630 automatically broadcasts an auto-discovery request 632 over network 600 to appliances within network 600 (e.g., appliances 610-1 through 610-n and appliance 620). The auto-discovery request by appliance 630 is provided by, but is not limited to, multicast Domain Name System (MDNS) broadcasting, or Domain Name System-Service Discovery (DNS-SD). In one embodiment, the broadcasted auto-discovery request is supported by Internet Protocol version 4 (IPv4).

It is noted that it may desired that a plurality of appliances are to be added to network 600 at substantially the same time. As such, an auto-discovery request is multicasted by one or more of appliances (that are intended to be added to the network) over network 600 to appliances within network 600. In one embodiment, the multicasted auto-discovery request is supported by Internet Protocol version 6 (IPv6). It should be appreciated that each appliance includes an auto-discovery agent (e.g., auto discovery agent 832-1) to implement the auto-discovery described herein.

Appliance 630 may broadcast auto-discovery request 632 at various times during operation. For example, auto-discovery request 632 may be broadcasted upon initial powering on of appliance 630, during initial operation of appliance 630, or when appliance 630 is initially communicatively coupled to network 600 (but not authenticated or configured to operate within network 600.

Auto-discovery request 632 includes a service type. For example, request 632 includes a request for devices (or appliances) that are pre-configured hyper-converged computing devices. In one embodiment, the service type in request 632 is the same as the service type of appliance 630 (e.g., pre-configured hyper-converged computing device).

As will be described in further detail below, appliances have a unique identifier. The unique identifier includes the service type of the particular appliance. As such, in one embodiment, auto-discovery request 632 includes a portion of the unique identifier of the appliance.

It should be appreciated that a service type may be an identifier that is associated with a service provided within a node of an appliance. The auto-discovery request is directed at a specific service type to locate only the nodes of interest. In one or more embodiments, the service type may be registered with the Internet Assigned Numbers Authority (IANA).

Appliances within network 600 provide responses 634 to auto-discovery request 632 by appliance 630. Appliances in network 600 that receive the auto-discovery request may be required to respond to the auto-discovery request. In particular, the appliances having the same service type as the service type in auto-discovery request 632 provide responses 634.

In one or more embodiments, an auto-discovery request may be implemented using a zeroconf (zero-configuration networking) protocol or other similar protocol where a node or a service broadcasts over a multicast protocol.

If a stand-alone appliance, such as appliance 620, in network 600 receives the auto-discovery request then the stand-alone appliance provides a response. If appliances in a cluster receive the auto-discovery request, then one or more appliances in the cluster provide a response indicating that they are in a cluster of appliances.

Responses 634 are accessed by appliance 630 and indicate the appliances that are authenticated and configured to operate in network 600.

In one embodiment, responses 634 are obtained and displayed for viewing by a user, such as an IT administrator for network 600. The user may then select for appliance 630 to join a cluster, such as cluster 610, or join network 600 as a stand-alone appliance.

In another embodiment, appliance 630 may automatically decide to join a cluster, such as cluster 610, or join network 600 as a stand-alone appliance. The automatic decision may be based on which appliances in network 600 that are most similar to appliance 630.

Examples of Authentication and Configuration of an Appliance in a Network

Figure 7:
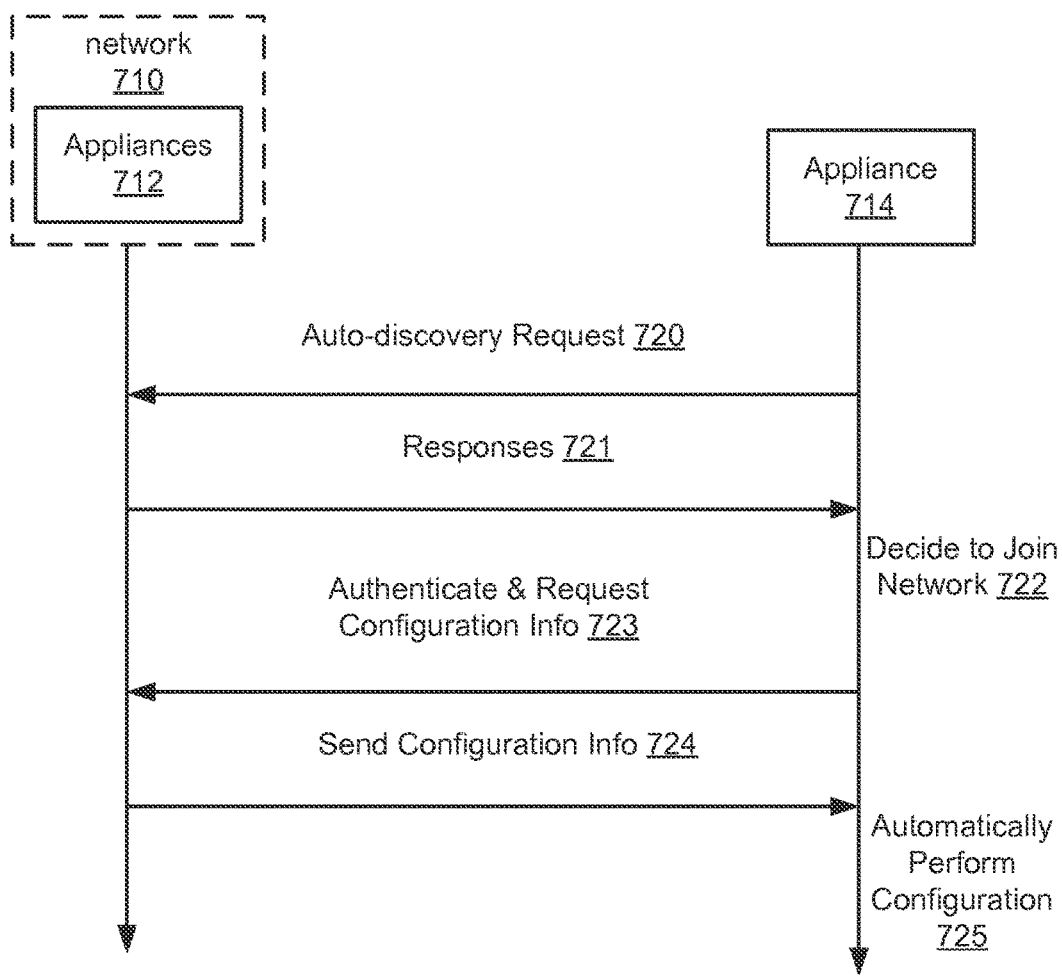
FIG. 7 depicts a flow diagram for a method for automatic network configuration of a pre-configured hyper-converged computing device, according to various embodiments.

FIG. 7 depicts a flow diagram 700 for a method for automatic configuration of an appliance. Network 710 includes appliances 712. Network 710 is similar to network 600, as described above. As such, appliances 712 are similar to appliances in network 600. In particular, appliance 714 is similar to appliance 630 in that it is desired that appliance 714 is to be configured for network 710.

At 720, appliance 714 broadcasts an auto-discovery request to appliances 712 in network 710. The broadcast by appliance 714 is the same as the broadcast of appliance 630 described herein.

At 721, appliances 712 that receive the auto-discovery request provide responses to appliance 714. The responses are the same as responses 634 described herein.

At 722, it is decided that appliance 714 will join the network, either as a stand-alone appliance, joining an existing appliance cluster, or creating a new cluster with an existing stand-alone device.

At 723, appliance is authenticated with network 710 and appliance 714 requests network configuration information from appliances already configured in network 712. The configuration information can be any information the enables appliance 714 to be configured in network 710. For example, configuration information can be, but is not limited to, internet protocol (IP) addresses, virtual local area network identification (VLAN IDs), etc.

The authentication is any secured authentication protocol, such as an authentication that utilizes a shared key.

At 724, network configuration information is sent to appliance 714 from one or more appliances 712.

At 725, appliance 714 automatically performs the network configuration such that it is configured to be a part of network 710.

II. Embodiments of Sharing Information Between Appliances Over a Wide Area Network Via a Distributed Peer-to-Peer Protocol As will be described in further detail herein, appliances or clusters of appliances, located in various geographical locations, are able to communicate with each other via a peer-to-peer protocol over a wide area network. As a result, among other things, there is no single point of failure for sharing the information (e.g., performance metrics) between appliances or clusters of appliances. Moreover, there is no single point of failure for accessing and viewing the information over the wide area network.

Examples of a Cluster of Appliances

Figure 8:
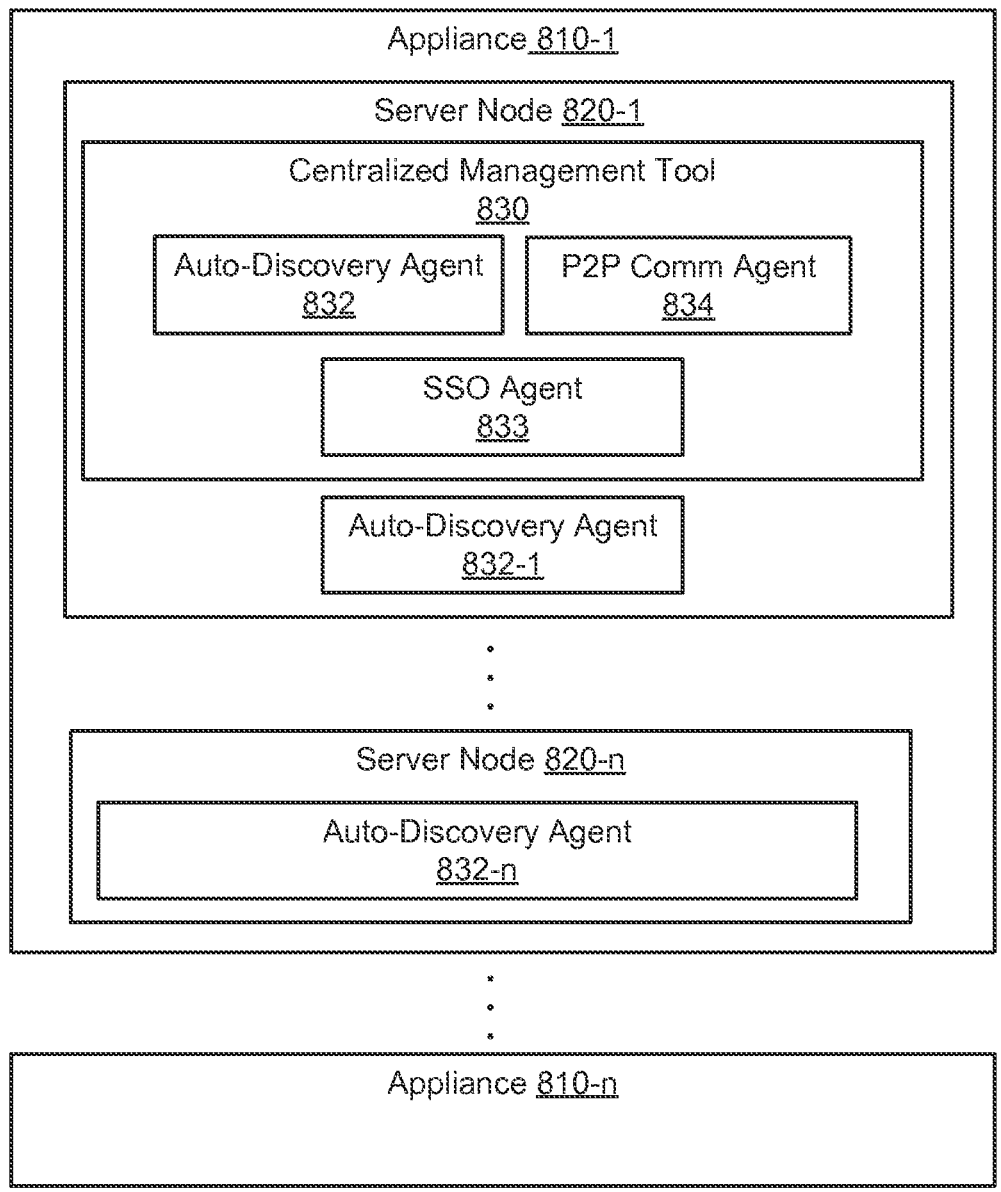
FIG. 8 depicts a block diagram of a cluster of appliances, according to various embodiments.

FIG. 8 depicts an embodiment of cluster 800 of appliances 810-1 through 810-n. It should be appreciated that cluster 800 is similar to other cluster of appliances, as described herein, such as cluster 610. However, cluster 800 enables, among other things, communication with other clusters (at various geographical locations) via a peer-to-peer protocol over a wide area network. In one embodiment, a cluster includes one appliance.

In general, a cluster of appliances are communicatively coupled together and act as a single platform for managing the virtualization infrastructure and deploying virtual machines. It should be appreciated that any number of appliances may be grouped together. For example, two, three, four, five or more appliances may be grouped together provided that the functionality of the appliances, as a whole, are able to act as a single platform for managing the virtualization infrastructure.

Appliances 810-1 through 810-n are similar to other appliances or hyper-converged computing devices, as described herein, such as, appliance 300. However, appliances 810-1 through 810-n are able to communicate with other appliances or clusters of appliances (at various geographical locations) via a peer-to-peer protocol over a wide area network.

Appliance 810-1 includes server nodes 820-1 through 820-n. Appliance 810-1 can include one server node or can include numerous server nodes. In one embodiment, appliance 810-1 includes four independent server nodes.

Each server node includes a CPU (e.g., CPU 311), memory (e.g., memory 312), storage (e.g., storage 313) and a software module (e.g., pre-configured software module 320). For brevity and clarity, the CPU, memory, storage and software module are not depicted in FIG. 8. It is noted that additional description of these features are provided with respect to at least FIG. 3.

Additionally, each server node in an appliance includes an auto-discovery agent. For example, server node 820-1 includes auto discovery agent 832-1 and server node 820-n includes auto-discovery agent 832-n.

An auto-discovery agent provides auto-discovery of other appliances in a network, such as a local area network (LAN). Referring to FIG. 6, the auto-discovery agent would enable appliance 630 to send auto-discovery request 632 to network 600 and receive responses 634 from the appliances and/or clusters of appliances for auto-discovery of the appliances and/or cluster of appliances in network 600.

Similarly, referring to FIG. 7, the auto-discovery agent enables appliance 714 to automatically discover appliances 712 in network 710, as described in detail herein.

In various embodiments, the auto-discovery agent is able to automatically discover other appliances and/or clusters of appliances in a local area network. However, in other embodiments, the auto-discovery agent is only able to automatically discover other appliances and/or clusters of appliances in the local area network that it is connected to or in communication with. That is, the auto-discovery agent is able to locate appliances/clusters of appliances in a first site (e.g., first geographical location, local area network) but unable to or not required to discover appliances/clusters of appliances in other sites (e.g., other geographical locations, other local area networks) connected to the first local network via wide area network (WAN).

Appliance 810-1 includes centralized management tool 830 for managing appliance 810-1 and/or cluster 800 of appliances. The centralized management tool, in one embodiment, is for the management of multiple ESX hosts and virtual machines (VMs) from different ESX hosts through a single console application. It should be appreciated that the virtualization infrastructure, or portions of the virtualization infrastructure (e.g., clusters of appliances, appliances, server nodes) may be managed by the centralized management tool via a user interface.

In one embodiment, centralized management tool 830 is included in a pre-configured software module (not shown) on one of the server nodes of the appliances, such as server node 820-1.

Centralized management tool 830 includes auto-discovery agent 832 which is for auto-discovery of other appliances and/or clusters of appliances, as described in detail herein.

Centralized management tool 830 also includes peer-to-peer (P2P) communication agent 834. In general, P2P communication agent 834 enables P2P communication between clusters of appliances, appliances or server nodes within a first LAN or geographical location to communicate with other clusters of appliances, appliances or server nodes within a second LAN or geographical location over a WAN.

The P2P protocol utilized by P2P communication agent 834 is a distributed P2P protocol. As a result, there is no centralized communication system that controls or manages the communication between the appliances over the WAN (which is in contrast to a conventional client-server model). In other words, the distributed P2P protocol provides for no single point of failure of communication between the appliances over the WAN.

The P2P protocol can be, but is not limited to a gossip P2P protocol.

The information communicated between the appliances via the P2P protocol can be, but is not limited to health metrics of the nodes/appliances, instructions, etc. For example, the health metrics can be, but are not limited to, CPU usage, memory usage, and/or storage usage pertaining to a server node, appliance and/or cluster of appliances, monitoring metrics, and networking metrics.

In another example, the information is updated software, such as an upgraded version of an ESX server.

In a further example, the information is instructions to put clusters, appliances and/or nodes into maintenance mode.

As a result, any information provided at a device (e.g. a server node) in network 900 is distributed, via the P2P protocol, to each and every functioning cluster, appliance and/or node that is communicatively coupled to sending device.

Examples of Clusters of Appliances in a Network

Figure 9:
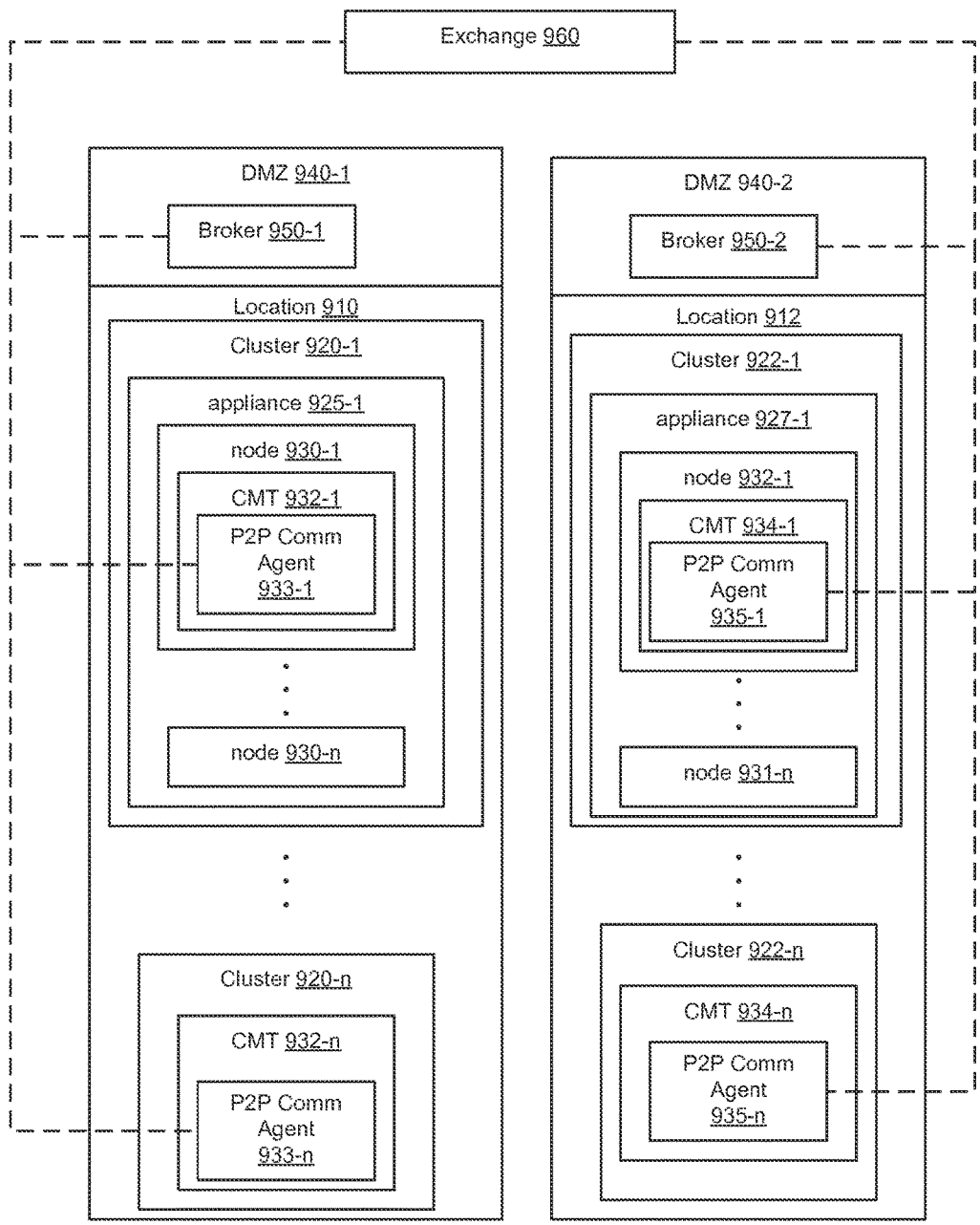
FIG. 9 depicts a block diagram of a network of appliances, according to various embodiments.

FIG. 9 depicts network 900 of clusters of appliances in disparate locations. As will be discussed in further detail below, the various appliances in network 900 located in various geographical locations are able to communicate with one another via a P2P protocol. As a result, information is communicated between appliances in various geographical locations without a single point of failure (or without a centralized network node such as in a conventional client-server network communication model).

Additionally, the information is communicated between appliances in various geographical locations without requiring the centralized management tools of the clusters of appliances being aware of each other. That is, clusters of appliances in a first location are not linked to or federated with clusters of appliances in a second location. More specifically, although the clusters of appliances in various geographical locations may communicate with each other via a P2P protocol, the clusters of appliances in various geographical locations are not linked in such a way as to enable load balancing between one another.

Network 900 includes location 910 and location 912. Location 910 includes cluster 920-1 of appliances through cluster 920-n of appliances, and location 912 includes cluster 922-1 of appliances through cluster 922-n of appliances. It should be appreciated that location 910 is scalable to include any number of clusters such as a single cluster to any number of clusters. Similarly, location 912 is scalable to include any number of clusters such as a single cluster to any number of clusters.

Moreover, network 900 depicts two separate or disparate geographical locations (i.e., location 910 and location 912). However, network 900 is scalable such that it can include any number of locations.

The locations in network 900, in various embodiments, are LANs. For example, network 900 is a WAN. As such, location 910 is a first LAN and location 912 is a second LAN, wherein the LANs are communicatively coupled via the WAN.

In various embodiments, network 900 or WAN can be, but is not limited to, a public network (e.g., internet) or a private network. Additionally, network 900 can be a private, public or hybrid cloud.

It should be appreciated that clusters depicted in network 900, as depicted in FIG. 9, such as cluster 920-1 and 922-1 are similar to at least cluster 800 described herein.

Moreover, nodes depicted in FIG. 9, such as nodes 930-1 through 930-n and nodes 932-1 through nodes 932-n, are similar to the nodes of cluster 800, such as server node 820-1, as described herein. For example, one or more appliances include the server nodes in network 900, wherein each server node includes an auto-discovery agent, such as auto-discovery agent 832-1.

As described above, the various appliances in network 900 located in various geographical locations are able to communicate with one another via a P2P protocol. More specifically, any node in an appliance located in a first location is able communicate with any other node in another location via a P2P protocol.

For example, node 930-1 (at location 910) is able to transmit information, via P2P communication agent 933-1, to node 931-1 of cluster 922-1 (at location 912), which is able to receive the information via P2P communication agent 935-1.

Similarly, node 930-1 (at location 910) is able to transmit information, via P2P communication agent 933-1, to a node of cluster 922-n (at location 912), which is able to receive the information via P2P communication agent 935-n.

In another example, node 930-n (at location 910) is able to transmit information, via P2P communication agent 933-n, to node 931-1 of cluster 922-1 (at location 912), which is able to receive the information via P2P communication agent 935-1.

Similarly, node 930-n (at location 910) is able to transmit information, via P2P communication agent 933-n, to a node of cluster 922-n (at location 912), which is able to receive the information via P2P communication agent 935-n.

Moreover, the appliances are able to transmit information to other appliances within the same geographical location or LAN. For example, node 930-1 (at location 910) is able to transmit information to any nodes in cluster 920-n (at location 910).

It should be appreciated that prior to the sharing of information between appliances, the appliances are able to automatically discover other appliances in a location via an auto-discovery agent, such as auto-discovery agent 832-1. For example, nodes in cluster 920-n are able to discover nodes 930-1 through 930-n of cluster 920-1 via auto-discovery agents in the nodes of cluster 920-n.

In various embodiments, clusters, appliances, and/or nodes (or hosts) are able to locate a broker in the same manner as auto-discovery of appliances, described herein. For example, clusters/appliances/nodes in location 910 are able to auto-discover broker 950-1 via an auto-discovery agent. Similarly, clusters/appliances/nodes in location 912 are able to auto-discover broker 950-2 via an auto-discovery agent. The brokers may be auto-discoverable while in a public network or in a private or closed network.

Network 900 includes broker 950-1 and 950-2 which may reside in a demilitarized zone (DMZ). For example, broker 950-1 resides in DMZ 940-1 and broker 950-2 resides in DMZ 940-2.

In general, a DMZ (or a perimeter network) is a physical or logical subnetwork that contains and exposes external-facing services to a larger and untrusted network, such as the Internet. The purpose of a DMZ is to add an additional layer of security to a LAN. As a result, there is only access to equipment in the DMZ, rather than any other part of the network.

Since the brokers are in a DMZ they are not in a LAN. As such, the brokers are not discoverable via auto-discovery. However, in order for network 900 to function properly, each centralized management tool is configured to know about at least one broker. Additionally, each broker is known to appliances in at least two LANs.

Alternatively, a broker may be in a LAN. In such a scenario, it either provides a path to a broker that is or itself is in contact with appliances in another LAN.

Broker 950-1 and broker 950-2 are communicatively coupled to exchange 960. As a result, information is able to be shared between location 910 and location 912 via the distributed P2P protocol. The brokers may include manual firewall and configuration.

For example, when nodes in cluster 920-1 share information with one another (via the P2P protocol), the information is also shared with broker 950-1 via P2P communication agent 933-1. The information shared with broker 950-1 is then broadcasted to exchange 960 via the P2P protocol utilized in network 900. The information broadcasted to exchange 960 is then transmitted, from exchange 960, to the nodes in location 912 via the P2P protocol.

Accordingly, clusters/appliances/nodes are able to share information with every other clusters/appliances/nodes in both the local site and every other location or LAN without being linked or federated with one another, as described above. For example, information is transmitted from cluster 920-1 to cluster 922-1 and cluster 922-n without centralized management tool 932-1 linked or federated with centralized management tool 934-1 of cluster 922-1 or with centralized management tool 934-n of cluster 922-n.

As described above, there is no single point of failure for accessing and viewing the information over the WAN. As a result, a user is able access network 900 at any device (e.g., cluster, appliance, node) and access the information that is transmitted over the network via the P2P protocol. In one embodiment, a user is able to access information about any device on the network at any device, but not information particular to the network itself.

In particular, network 900 utilizes a platform services controller or federated single sign-on (SSO) that provides various functionality for network support and management such as enabling no single point of failure for sharing information between nodes in the network and for accessing and viewing the information over the WAN.

The federated SSO enables a distributed authentication system such as authentication between centralized management tools in network 900. For example, a federated SSO enables authentication of centralized management tools 932-1, 932-n, 934-1, and 934-n in network 900. The authentication, in one embodiment, is between the centralized management tools of each cluster in network 900. In one embodiment, each of the centralized management tools includes an SSO agent (e.g., SSO agent 833) configured to implement the authentication between the centralized management tools in the network as described herein.

Additionally, the federated SSO enables storage of static information and the distribution of the static information over network 900. The static information, can be, but is not limited to, IP addresses, host names, DNS settings, uptime, etc. In one embodiment, network 900 utilizes a lotus protocol for sharing the static information.

Based, in part, on the P2P protocol and the federated SSO, information (e.g., metrics, updated software, etc.) is able to be distributed, without a single point of failure, between appliances. For example, information, such as an updated auto-discovery agent for node 930-1 9 (at location 910), is provided at node 931-1 (at location 912). As a result, the auto-discovery agent at node 930-1 is updated. Moreover, the information is distributed via the P2P protocol to all other nodes in network 900. As a result, the auto-discovery agents in all the functioning nodes that receive the information also update the auto-discovery agent.

In another example, information is provided to cluster 922-1 (at location 912) that cluster 920-1 (at location 910) is to be switched to maintenance mode. The information is distributed throughout network 900 via the P2P protocol until cluster 920-1 receives the information. As a result, cluster 920-1 switches to maintenance mode in response to receiving the information via the P2P protocol.

Additionally, based in part on the P2P protocol and the federated SSO, a user is able to view the information (e.g. metrics) at any location (e.g., cluster, appliance, node) without a single point of failure. As a result, there is a single point of visibility across the entire network 900 to all of the distributed information.

For example, a user accesses node 930-1 and views all of the metrics (e.g., CPU usage, memory usage, storage usage) of each node in network 900 via a single user interface. Additionally, if various clusters, appliances and/or nodes in network 900 are off-line or have failed, the user is able to view all the metrics of each functioning node in network 900 due the distributed nature of the P2P communication throughout network 900.

In another example, location 910 is an office building and location 912 is a submarine. As such, a user (who is not located at location 912) is able to access and view all the metrics of each cluster, appliance and/or node in network 900 by accessing a node in location 910.

Continuing the above example, a user (who is not located at location 912) is able to access a node at location 910 and provide information (e.g., software updates) that is to be received and executed at location 912. In particular, the information provided at location 910 is distributed via the P2P protocol through network 900 until it is received at location 912.

Example Methods of Operation

The following discussion sets forth in detail the operation of some example methods of operation of embodiments.

Figure 10:
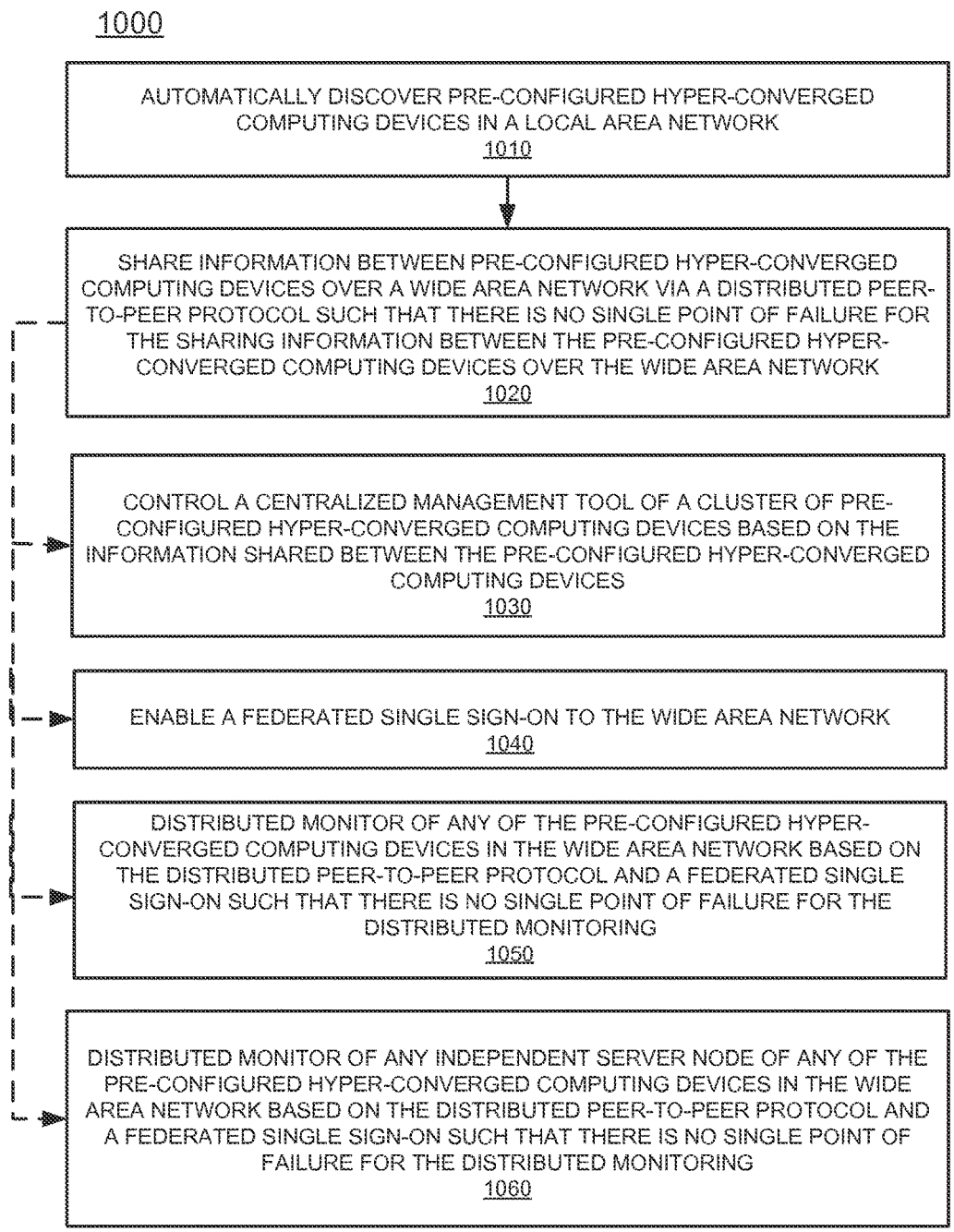
FIG. 10 depicts a flow diagram for a method for sharing information between pre-configured hyper-converged computing devices over a wide area network via a distributed peer-to-peer protocol, according to various embodiments.

With reference to FIGS. 10, 11 and 12, flow diagrams 1000, 1100 and 1200 illustrate example procedures used by various embodiments. Flow diagrams 1000, 1100 and 1200 include some procedures that, in various embodiments, are carried out by a processor under the control of computer-readable and computer-executable instructions. In this fashion, procedures described herein and in conjunction with flow diagrams 1000, 1100 and 1200 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., cluster 800 and/or network 900). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 1000, 1100 and 1200 such procedures are examples. That is, embodiments are well suited to performing various other procedures or variations of the procedures recited in flow diagrams 1000, 1100 and 1200. Likewise, in some embodiments, the procedures in flow diagrams 1000, 1100 and 1200 may be performed in an order different than presented and/or not all of the procedures described in one or more of these flow diagrams may be performed. It is further appreciated that procedures described in flow diagrams 1000, 1100 and 1200 may be implemented in hardware, or a combination of hardware with firmware and/or software provided by appliances or clusters of appliances.

FIG. 10 depicts a process flow diagram 1000 for sharing information between pre-configured hyper-converged computing devices over a wide area network via a distributed peer-to-peer protocol, according to various embodiments.

At 1010 of flow diagram 1000, pre-configured hyper-converged computing devices are automatically discovered in a local area network. For example, appliance 925-1 in cluster 920-1 automatically discovers other appliances in clusters 920-1 and 920-n at location 910 via an auto-discovery agent, such as auto-discovery agent 832-1.

At 1020, information is shared between pre-configured hyper-converged computing devices over a wide area network via a distributed peer-to-peer protocol such that there is no single point of failure for the sharing information between the pre-configured hyper-converged computing devices over the wide area network. For example, information such as operational metrics of nodes in appliance 925-1 (at location 910) is shared over network 900 with other appliances in location 910 and other appliances in location 912 (e.g., appliance 927-1) via a distributed P2P communication protocol implemented by network 900. As a result, there is no single point of failure for the sharing and distribution of the operational metrics throughout network 900.

Moreover, network 900 does not require a universal resource usage and monitoring feature to view and monitor the operational metrics of the appliances in network 900 because of the utilization of distributed sharing of the operation metrics via the P2P protocol.

At 1030, control a centralized management tool of a cluster of pre-configured hyper-converged computing devices based on the information shared between the pre-configured hyper-converged computing devices. For example, a user provides software updates for centralized management tool 932-1 at any point (e.g., cluster, appliance, node) in network 900. As a result, centralized management tool 932-1 is able to be updated (or controlled) by receiving the updated software via the distributed P2P protocol implemented in network 900.

At 1040, a federated single sign-on to the wide area network is enabled. For example, network 900 implements a federated SSO such that various central management tools of each cluster of appliances are authenticated with one another.

At 1050, distributed monitoring of any of the pre-configured hyper-converged computing devices in the wide area network is provided based on the distributed P2P protocol and a federated SSO such that there is no single point of failure for the distributed monitoring. For example, operational metrics is shared among appliances in network 900 across various geographical locations using a distributed P2P protocol (e.g., gossip protocol). Additionally, a federated SSO is utilized to enable a distributed authentication system. As a result, the operations metrics of each appliance in network 900 are distributed across the network to each of the other appliances such that there is no single point of failure for the distribution and monitoring of the operational metrics within network 900.

At 1060, distributed monitor of any independent server node of any of the pre-configured hyper-converged computing devices in the wide area network based on the distributed peer-to-peer protocol and a federated single sign-on such that there is no single point of failure for the distributed monitoring. For example, operational metrics of each functioning server node in network 900 is shared with each of the other functioning server nodes in network 900 using a distributed P2P protocol (e.g., gossip protocol). Additionally, a federated SSO is utilized to enable a distributed authentication system. As a result, the operations metrics of each server node in network 900 are distributed across the network to each of the other nodes such that there is no single point of failure for the distribution and monitoring of the operational metrics within network 900.

It is noted that any of the procedures, stated above, regarding flow diagram 1000 may be implemented in hardware, or a combination of hardware with firmware and/or software. For example, any of the procedures are implemented by a processor(s) of a cloud environment and/or a computing environment.

FIG. 11 depicts a process flow diagram 1100 for sharing information between pre-configured hyper-converged computing devices over a wide area network via a distributed peer-to-peer protocol, according to various embodiments.

At 1110 of flow diagram 1100, metrics are shared between pre-configured hyper-converged computing devices over a wide area network via a distributed peer-to-peer protocol, wherein at least some of the pre-configured hyper-converged computing devices are located in separate geographical locations. For example, appliance 925-1 is located in a first LAN at location 910 and appliance 927-1 is located in a second LAN at location 912. Operational metrics of each appliance are shared with one another over network 900 via a distributed P2P protocol.

At 1120, distributed monitoring of any of the pre-configured hyper-converged computing devices in the wide area network is provided based on the distributed peer-to-peer protocol and a federated single sign-on such that there is no single point of failure for the distributed monitoring. For example, operational metrics is shared among appliances in network 900 across various geographical locations using a distributed P2P protocol (e.g., gossip protocol). Additionally, a federated SSO is utilized to enable a distributed authentication system. As a result, the operations metrics of each appliance in network 900 are distributed across the network to each of the other appliances such that there is no single point of failure for the distribution and monitoring of the operational metrics within network 900.

At 1122, distributed monitoring of any independent server node of any of the pre-configured hyper-converged computing devices in the wide area network is provided. For example, operational metrics of each functioning server node in network 900 is shared with each of the other functioning server nodes in network 900 using a distributed P2P protocol (e.g., gossip protocol). Additionally, a federated SSO is utilized to enable a distributed authentication system. As a result, the operations metrics of each server node in network 900 are distributed across the network to each of the other nodes such that there is no single point of failure for the distribution and monitoring of the operational metrics within network 900.

At 1130, the pre-configured hyper-converged computing devices are automatically discovered in a local area network. For example, appliance 925-1 in cluster 920-1 automatically discovers other appliances in clusters 920-1 and 920-n at location 910 via an auto-discovery agent, such as auto-discovery agent 832-1.

At 1140, a centralized management tool of a cluster of pre-configured hyper-converged computing devices is controlled based on the information shared between the pre-configured hyper-converged computing devices. For example, a user provides software updates for centralized management tool 932-1 at any point (e.g., cluster, appliance, node) in network 900. As a result, centralized management tool 932-1 is able to be updated (or controlled) by receiving the updated software via the distributed P2P protocol implemented in network 900.

It is noted that any of the procedures, stated above, regarding flow diagram 1100 may be implemented in hardware, or a combination of hardware with firmware and/or software. For example, any of the procedures are implemented by a processor(s) of a cloud environment and/or a computing environment.

FIG. 12 depicts a process flow diagram 1200 for peer-to-peer communication outside of a local area network via a network broker, according to various embodiments.

At 1210, a computing device automatically discovers other computing devices in a local area network. For example, an auto-discovery agent (e.g., auto-discovery agent 832) of appliance 925-1 (e.g., a pre-configured hyper-converged computing device) automatically discovers other similar appliances in a LAN, such as a LAN in location 910.

At 1220, a computing device peer-to-peer communicates with another computing device outside of the local area network via a network broker. For example, node 930-n of appliance 925-1 (at a LAN in location 910) communicates with node 931-n of appliance 927-1, wherein appliance 927-1 is at location 912 and not a part of the LAN at location 910.

Moreover, the peer-to-peer communication is enabled by network brokers. For example, node 930-n is able to share information with broker 950-1, which is then broadcasted to exchange 960 via the P2P protocol utilized in network 900.

The information broadcasted to exchange 960 is then transmitted, from exchange 960, to at least node 931-n in location 912 via the P2P protocol.

At 1222, in one embodiment, metrics are shared between pre-configured hyper-converged computing devices over a wide area network via a distributed peer-to-peer protocol. For example, computing metrics appliances in location 910 are shared with appliances in location 912 via the P2P protocol as described herein.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What we claim is:

1. A non-transitory computer-readable storage medium having instructions embodied therein that when executed cause a computer system to perform a method of sharing information between pre-configured hyper-converged computing devices over a wide area network via a distributed peer-to-peer protocol, the method comprising:
    automatically discovering pre-configured hyper-converged computing devices in a local area network, wherein at least one of said pre-configured hyper-converged computing devices comprises:
    an enclosure;
    a central processing unit (CPU) disposed within said enclosure;
    a storage component disposed with said enclosure;
    a plurality of server nodes disposed within said enclosure, each of said plurality of server nodes configured to independently host a plurality of virtual machines, each of said plurality of server nodes not required to share any functionality with any other of said plurality of server nodes, said pre-configured hyper-converged computing device not including a backplane such that each of said plurality of server nodes is isolated from any other of said plurality of server nodes and such that each of said plurality of server nodes is independent of any other of said plurality of server nodes;
    a network component disposed within said enclosure, each of said storage component, said plurality of server nodes and said network component pretested, pre-configured and pre-integrated into said enclosure;
    a single stock keeping unit (SKU) corresponding to said at least one of said pre-configured hyper-converged computing devices, such that said at least one of said pre-configured hyper-converged computing devices can be offered for sale as a single SKU, said at least one of said pre-configured hyper-converged computing devices is not required to include any additional hardware or software to support and manage a virtualization infrastructure; and
    a hypervisor configured to support said virtualization infrastructure;
    signing on to said wide area network using a single sign-on agent, that when executed, enables a federated single sign-on to said wide area network;
    providing peer-to-peer communication between at least two of said pre-configured hyper-converged computing devices in said wide area network using a peer-to-peer communication agent; and
    sharing information between said pre-configured hyper-converged computing devices over said wide area network via a distributed peer-to-peer protocol such that there is no single point of failure for said sharing information between said pre-configured hyper-converged computing devices over said wide area network.

2. The non-transitory computer-readable storage medium of claim 1, further comprising:
    controlling a centralized management tool of a cluster of pre-configured hyper-converged computing devices based on said information shared between said pre-configured hyper-converged computing devices.

3. The non-transitory computer-readable storage medium of claim 1, further comprising:
    distributed monitoring of any of said pre-configured hyper-converged computing devices in said wide area network based on said distributed peer-to-peer protocol and a federated single sign-on such that there is no single point of failure for said distributed monitoring.

4. The non-transitory computer-readable storage medium of claim 1, further comprising:
distributed monitoring of any of said plurality of server nodes of any of said pre-configured hyper-converged computing devices in said wide area network based on said distributed peer-to-peer protocol and a federated single sign-on such that there is no single point of failure for said distributed monitoring.

5. The non-transitory computer-readable storage medium of claim 1, wherein said wide area network is a non-federated environment.

6. The non-transitory computer-readable storage medium of claim 1, wherein said shared information does not provide instructions for load balancing.

7. The non-transitory computer-readable storage medium of claim 1, wherein said shared information is selected from group of information comprising: CPU metrics, memory metrics, and storage metrics.

8. The non-transitory computer-readable storage medium of claim 1, wherein said wide area network is a private network.

9. A computer-implemented method of distributed monitoring of pre-configured hyper-converged computing devices over a wide area network, the method comprising:
sharing metrics between pre-configured hyper-converged computing devices over a wide area network via a distributed peer-to-peer protocol, wherein at least some of said pre-configured hyper-converged computing devices are located in separate geographical locations, wherein at least one of said pre-configured hyper-converged computing devices comprises:
an enclosure;
a central processing unit (CPU) disposed within said enclosure;
a storage component disposed with said enclosure;
a plurality of server nodes disposed within said enclosure, each of said plurality of server nodes configured to independently host a plurality of virtual machines, each of said plurality of server nodes not required to share any functionality with any other of said plurality of server nodes, said pre-configured hyper-converged computing device not including a backplane such that each of said plurality of server nodes is isolated from any other of said plurality of server nodes and such that each of said plurality of server nodes is independent of any other of said plurality of server nodes;
a network component disposed within said enclosure, each of said storage component, said plurality of server nodes and said network component pretested, pre-configured and pre-integrated into said enclosure;
a single stock keeping unit (SKU) corresponding to said at least one of said pre-configured hyper-converged computing devices, such that said at least one of said pre-configured hyper-converged computing devices can be offered for sale as a single SKU, said at least one of said pre-configured hyper-converged computing devices is not required to include any additional hardware or software to support and manage a virtualization infrastructure; and
a hypervisor configured to support said virtualization infrastructure;

signing on to said wide area network using a single sign-on agent, that when executed, enables a federated single sign-on to said wide area network;
providing peer-to-peer communication between at least two of said pre-configured hyper-converged computing devices in said wide area network using a peer-to-peer communication agent; and
distributed monitoring of any of said pre-configured hyper-converged computing devices in said wide area network based on said distributed peer-to-peer protocol and said federated single sign-on such that there is no single point of failure for said distributed monitoring.

10. The computer-implemented method of claim 9, further comprising:
automatically discovering said pre-configured hyper-converged computing devices in a local area network.

11. The computer-implemented method of claim 9, further comprising:
controlling a centralized management tool of a cluster of pre-configured hyper-converged computing devices based on said information shared between said pre-configured hyper-converged computing devices.

12. The computer-implemented method of claim 9, wherein said distributed monitoring of any of said pre-configured hyper-converged computing devices further comprises:
distributed monitoring of any of said plurality of server nodes of any of said pre-configured hyper-converged computing devices in said wide area network.

13. The computer-implemented method of claim 9, wherein said wide area network is a non-federated environment.

14. The computer-implemented method of claim 9, wherein said shared metrics does not provide instructions for load balancing.

15. The computer-implemented method of claim 9, wherein said shared metrics is selected from group of metrics comprising: CPU metrics, memory metrics, and storage metrics.

16. The computer-implemented method of claim 9, wherein said wide area network is a public network.

17. A computer-implemented method for peer-to-peer communication outside of a local area network via a network broker, the computer-implemented method comprising:
automatically discovering, by a computing device, other computing devices in a local area network wherein said computing device is a pre-configured hyper-converged computing device, and wherein at least one of said pre-configured hyper-converged computing devices comprises:
an enclosure;
a central processing unit (CPU) disposed within said enclosure;
a storage component disposed with said enclosure;
a plurality of server nodes disposed within said enclosure, each of said plurality of server nodes configured to independently host a plurality of virtual machines, each of said plurality of server nodes not required to share any functionality with any other of said plurality of server nodes, said pre-configured hyper-converged computing device not including a backplane such that each of said plurality of server nodes is isolated from any other of said plurality of server nodes and such that each of said plurality of server nodes is independent of any other of said plurality of server nodes;

a network component disposed within said enclosure, each of said storage component, said plurality of server nodes and said network component pretested, pre-configured and pre-integrated into said enclosure;

a single stock keeping unit (SKU) corresponding to said at least one of said pre-configured hyper-converged computing devices, such that said at least one of said pre-configured hyper-converged computing devices can be offered for sale as a single SKU, said at least one of said pre-configured hyper-converged computing devices is not required to include any additional hardware or software to support and manage a virtualization infrastructure; and a hypervisor configured to support said virtualization infrastructure;

signing on to said wide area network using a single sign-on agent, that when executed, enables a federated single sign-on to said wide area network;

providing peer-to-peer communication between at least two of said pre-configured hyper-converged computing devices in said wide area network using a peer-to-peer communication agent; and peer-to-peer communicating, by said computing device, with another computing device outside of said local area network via a network broker.

* * * * *